May 21, 1940.  A. M. NEY  2,201,785
ENGINE
Filed Sept. 1, 1937  4 Sheets-Sheet 1

INVENTOR.
ALFRED M. NEY
BY McConkey, Dawson & Booth
ATTORNEY.

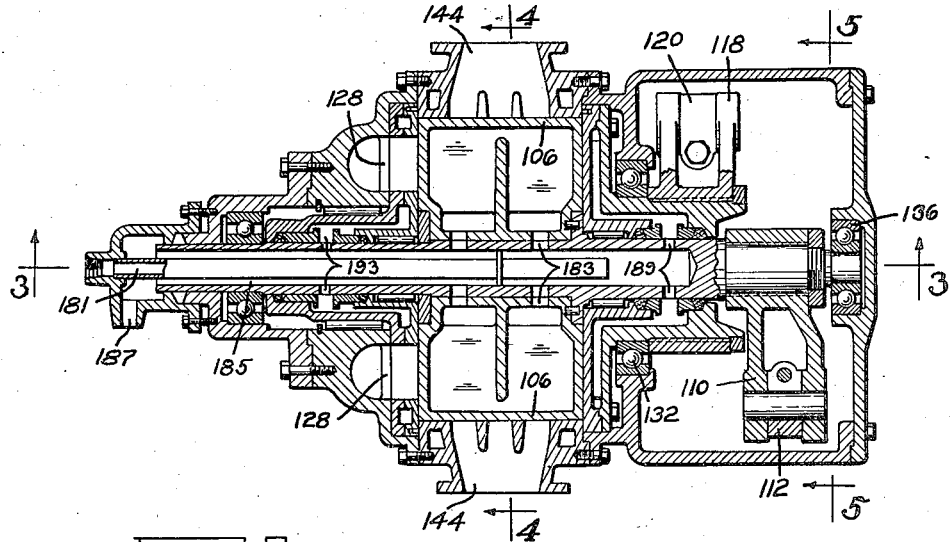
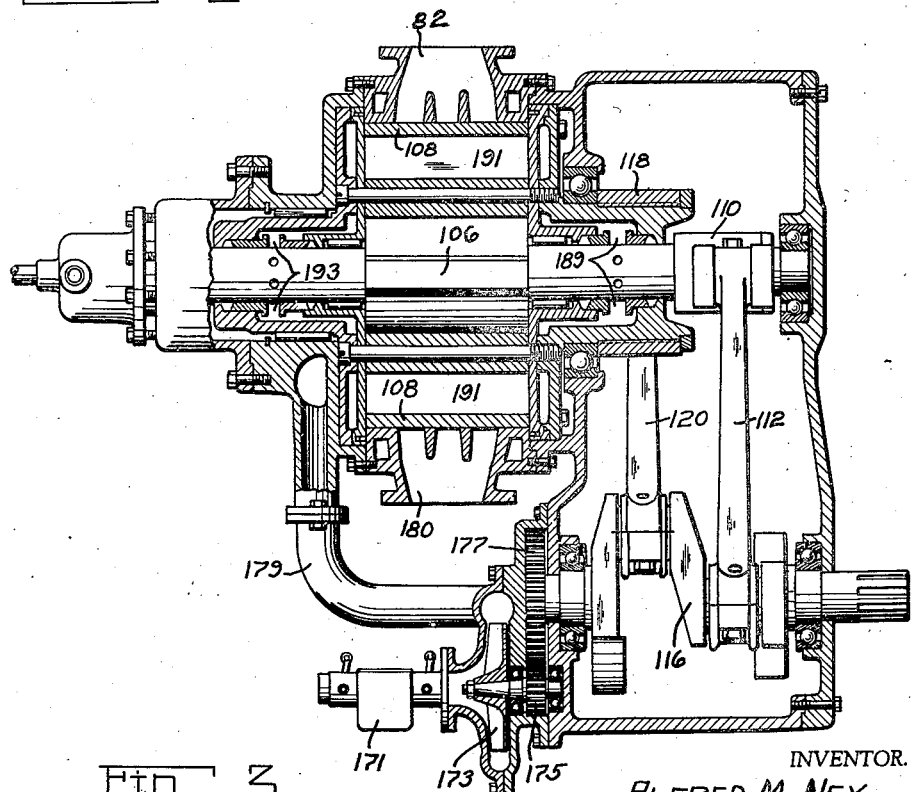

INVENTOR.
ALFRED M. NEY
BY
McConkey, Dawson & Booth
ATTORNEY.

May 21, 1940.  A. M. NEY  2,201,785
ENGINE
Filed Sept. 1, 1937  4 Sheets-Sheet 4
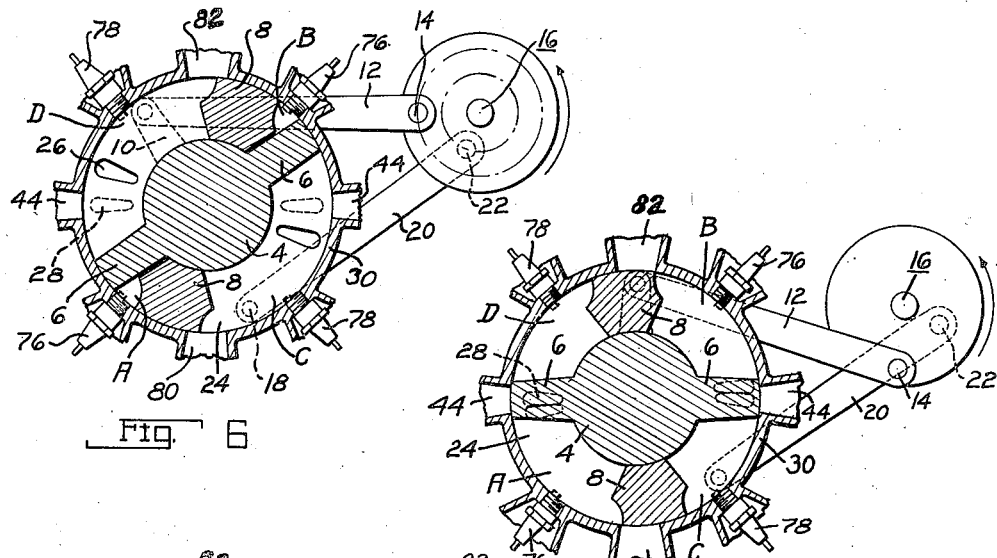
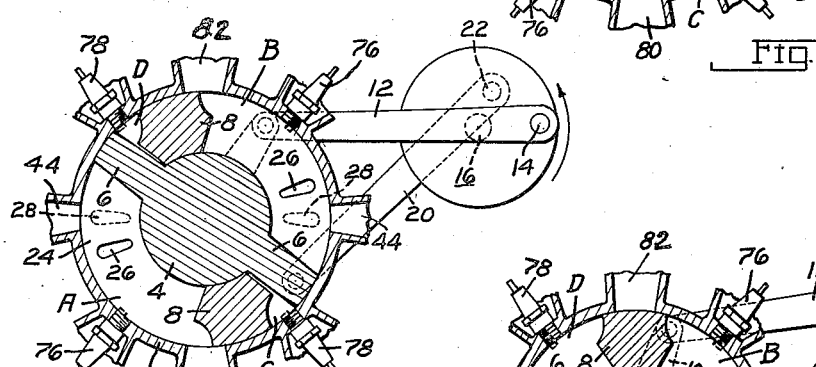
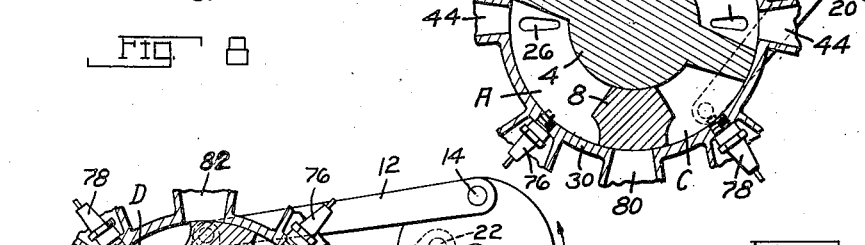
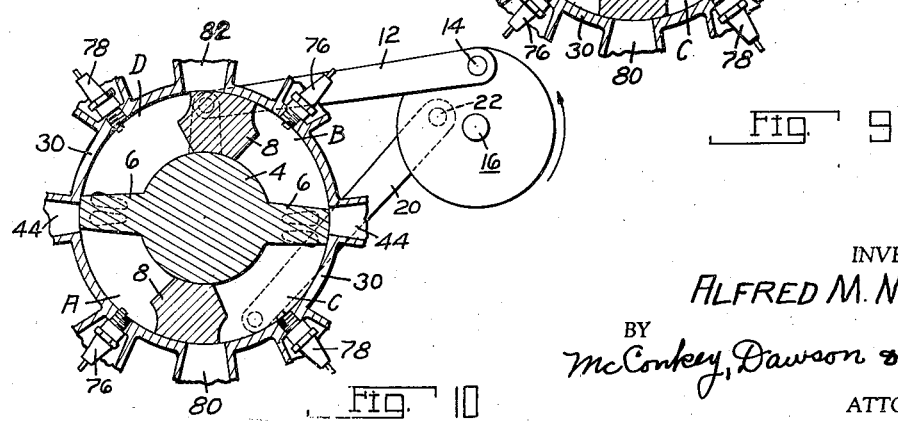
INVENTOR.
ALFRED M. NEY
BY McConkey, Dawson & Booth
ATTORNEY.

Patented May 21, 1940

2,201,785

UNITED STATES PATENT OFFICE 2,201,785

ENGINE

Alfred M. Ney, South Bend, Ind., assignor to International Engineering Corporation, Chicago, Ill., a corporation of Illinois Application September 1, 1937, Serial No. 161,896

12 Claims. (Cl. 123—18)

This invention relates to engines and more particularly to a two-cycle engine of the type wherein oscillating blades and oscillating cylinder blocks are employed to form the combustion chambers.

An object of this invention is to provide an oscillating blade type engine, operating on the two cycle principle, wherein both the cylinder blocks and the blades are free to oscillate and to transmit power to a crank shaft operably connected to the cylinder blocks and blades.

A further object of this invention is to provide an engine having oscillating cylinder blocks and blades wherein means are provided to produce "over-expansion."

Another object of the invention is to provide a symmetrically balanced engine having two driven cranks operably connected to oscillating cylinder blocks and blades.

A further object is to provide an engine structure wherein the charging losses are practically eliminated by delaying the fuel charging cycle until the exhaust port is closed and by employing free air to aid in expelling the products of combustion from the combustion chamber.

Yet a further object of the invention is to provide an engine capable of generating a greater quantity of power per unit weight than similar structures of the prior art.

Another object of the invention is to provide an engine of simple design which can be manufactured economically, and which will deliver increased power per unit weight of engine structure.

A further object of the invention is to provide novel charging and exhausting means for a two-cycle engine.

A still further object of the invention is to provide an engine so disposed that a quantity of scavenging or free air is injected into the combustion chambers to assist in removing the products of combustion from the cylinders at the end of the power stroke, and wherein a rich mixture of fuel and air is injected into the combustion chambers after the exhaust ports have been closed, thereby minimizing the loss due to charging the combustion chambers.

Yet a further object of the invention is to provide novel means operably connected to two oscillating units in such a manner that the combustion chamber volume, when the intake port closes, is considerably less than the volume of the combustion chamber at the end of the power stroke, when the exhaust port is opened.

Another object of the invention is to provide an engine having a power unit operably connected to drive a rotatable crank shaft, positioned adjacent the power unit, which is connected to a drive or propeller shaft, positioned intermediate the crank shaft and the power unit and driven thereby through reduction gears.

A still further object of the invention is to provide a novel method of charging a two-cycle engine by injecting a rich mixture of fuel and air into the combustion chamber after the exhaust port has closed.

Other objects and advantages of this invention will be apparent from the following detailed description, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 2 is a view, similar to Figure 1, showing a modified form of the invention;

Figure 3 is a view taken on the line 3—3 of Figure 2;

Figures 6 to 10 are diagrammatic views illustrating the relative positions of the oscillating cylinder blocks and blades of the engine in five different operating positions.

Figure 1:
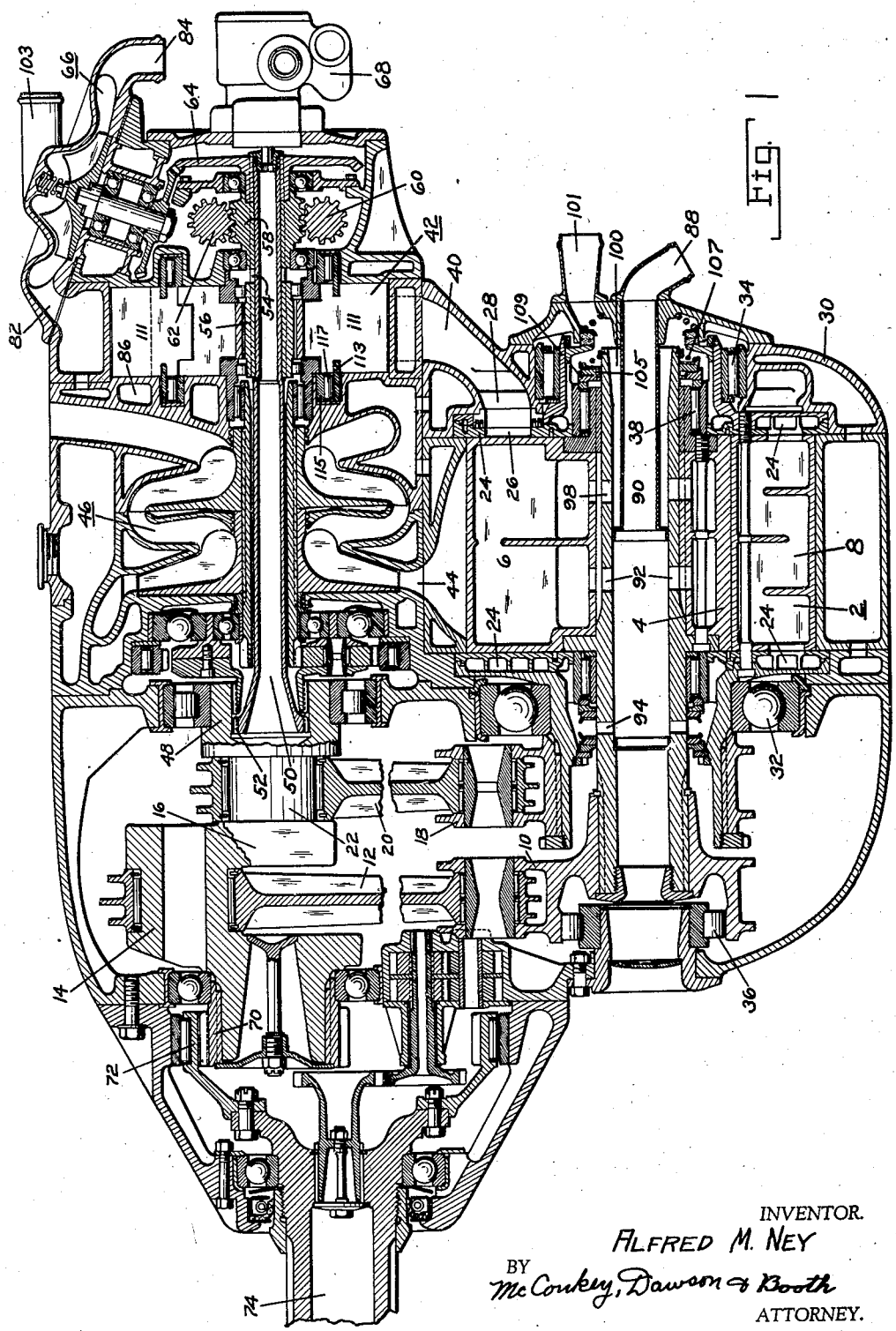
Figure 1 is a vertical section through an engine embodying the present invention.
Figure 4:
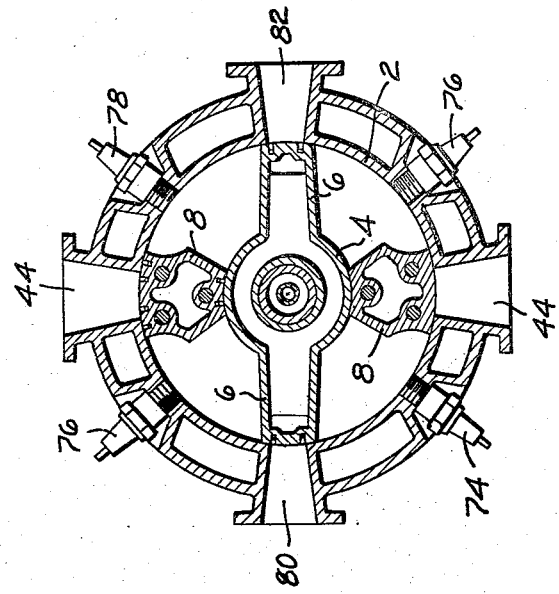
Figure 4 is a view taken on the line 4—4 of Figure 2.
Figure 5:
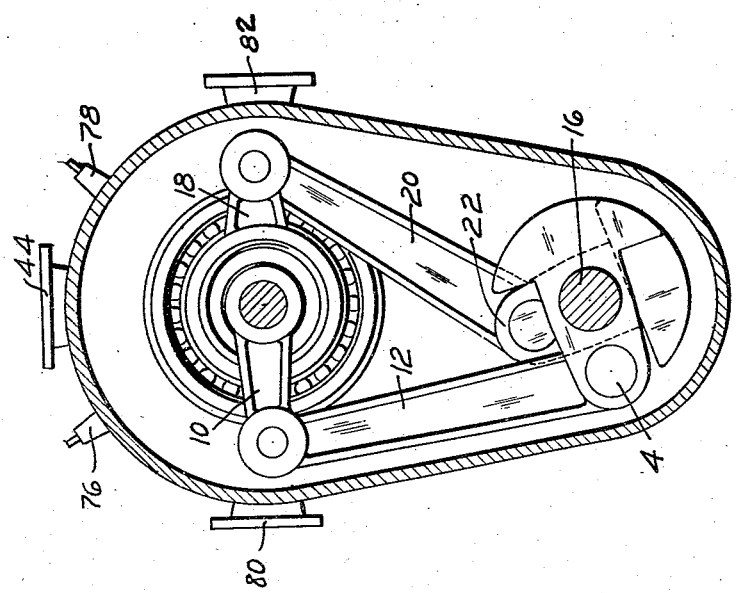
Figure 5 is a view taken on the line 5—5 of Figure 2.

Referring more particularly to Figures 1 and 4, there is shown an engine having a longitudinally disposed power cylinder 2 having an oscillatable hub 4, provided with diametrically opposed pistons or blades 6. A pair of diametrically opposed oscillatable cylinder blocks 8 are positioned in the power cylinder 2, and engage the outer surface of the hub 4 and the inner surface of the cylinder 2 in fluid-tight relation. The oscillating hub 4 is provided with an arm 10, which is connected by a connecting rod 12 to one of the cranks 14 of a crank shaft 16. The oscillating movement of the arm 10 and the distance between the center line of the crank shaft 16 and the crank 14 are so proportioned that the oscillating movement of the arm 10 results in continuous rotary movement of the crank shaft 16.

The oscillatable cylinder blocks 8 are operably connected to an arm 18, which is connected through a connecting rod 20 to one of the cranks 22 of the crank shaft 16. The oscillating movement of the arm 18 and the distance from the center line of the crank shaft 16 to the center line of the crank 22 are also so proportioned that oscillating movement of the arm 18 results in continuous rotary movement of the crank shaft 16.

The cylinder blocks 8 are provided with end plates 24 having diametrically opposed elongated charging ports or slots 26 (Figures 6 to 10) designed to register with cooperating charging ports or slots 28 formed in the housing 30 of the power cylinder 2.

The oscillating blocks 8 are supported at one end on bearings 32 and at the other end on needle bearings 34. The oscillating hub 4 is supported at one end on roller bearings 36 and at the other end on needle bearings 38. The hub 4 is thus supported on bearings positioned within the bearings supporting the cylinder blocks 8. This structure results in a concentrically balanced unit, which is relatively free from vibration.

The slot 28 in the housing 30 communicates with a passageway 40 connected to a high pressure blower 42 adapted to supply a rich mixture of fuel and air to the combustion chambers of the engine under certain operating conditions, more particularly described hereinafter.

The power cylinder 2 is provided with a pair of diametrically opposed inlet ports 44 to admit a quantity of free air to the combustion chambers under certain operating conditions, more fully described hereinafter. The inlet ports 44 communicate with a blower 46, preferably of the two-stage centrifugally actuated type.

The crank shaft 16 is provided at one end with an enlarged internally splined segment 48, which engages with and drives an inner shaft 50 having a pinion 52 engaging the inner threads of the segment 48.

The shaft 50 extends longitudinally through the blower 46 and is provided with a spline 54, which meshes with an internally splined sleeve 56, which rotates and drives the high pressure blower 42. The shaft 50 is further provided with a pinion 58, which meshes with a pair of worm gears 60 and 62. The worm gear 60 is adapted to drive a dual ignition system of any desired type, and the worm gear 62 preferably drives a tachometer and a machine gun synchronizer. The end of the shaft 50 is fitted with a bevel gear 64, from which any desired accessories may be driven such, e. g., as a water pump 66, an inertia starter and a generator positioned at any desired angle with respect to the water pump 66. The central shaft of the bevel gear 64 may drive a fuel pump 68.

The other end of the crank shaft 16 is provided with a pinion 70 adapted to mesh with an internally toothed sun gear 72, operably connected to drive the propeller shaft 74 at any desired speed with respect to the speed of rotation of the crank shaft 16.

The cycle of operation of the power cylinder 2 will now be described with particular reference to Figures 6 to 10. It will be observed that the oscillating hub 4 and the diametrically opposed blades 6 cooperate with the oscillating blocks 8 positioned in the housing 30 to form two pairs of equally spaced diametrically opposed combustion chambers A and B, and C and D. The combustion chambers A and B are provided with spark plugs 76, and the combustion chambers C and D are provided with spark plugs 78. An exhaust port 80 is positioned midway between the spark plugs 76 and 78 of the combustion chambers A and C, and an exhaust port 82 is positioned midway between the spark plugs 76 and 78 of the combustion chambers B and D.

It will be observed that in the operation of this engine the crank shaft 16 rotates in the counterclockwise direction, as viewed in Figures 6 to 10, and that the connecting rod 12, operably connected to the oscillating blade 6 through the arm 10, oscillates the blades 6 back and forth within the housing 30 from the position shown in Figure 6, when one surface of the blade 6 is positioned adjacent the spark plugs 76, to the position shown in Figure 8, when the opposite surfaces of the blade 6 are adjacent the spark plug 78. The connecting rod 20, operably connected to the crank 22 of the crank shaft 16, operates through the arm 18 to oscillate the cylinder blocks 8 back and forth in the housing 30 from the position shown in Figure 6, when one surface of each of the blocks 8 is adjacent the spark plugs 76, to the position shown in Figure 8, when the opposite surfaces of the blocks 8 are adjacent the spark plugs 78.

It thus appears that a plurality of opposed combustion chambers are formed wherein each of the members forming the side walls of the chambers is movable in an opposite direction to transmit the power of the combustion stroke to the crank shaft by the connecting linkage described.

The operation of this engine is as follows. Figure 6 shows the blade 6 and the blocks 8 in the proper position to initiate a power stroke in the combustion chambers A and B. The spark plugs 76 ignite the compressed gases, whereupon the power stroke is initiated to move the cylinder blocks 8 in the counter-clockwise direction and to move the blade 6 in the clockwise direction. Referring more particularly to the combustion chambers A and B, it will be observed that when the parts have moved to the position shown in Figure 7 the cylinder blocks 8 move to the position to uncover the exhaust ports 80. As soon as the exhaust ports are opened the pressure in the chambers A and B immediately drops. As soon as the cycle progresses, the blades 6 uncover the inlet ports 44, communicating with the blower 46, to admit scavenging air to facilitate in discharging the products of combustion from the combustion chambers A and B. Figure 8 shows the blades 6 and the cylinder blocks 8 at the end of this cycle of operation, whereupon a charge will have been compressed in the combustion chambers C and D preparatory to the next cycle of operation. The compressed charge is then ignited by the spark plugs 78, whereupon the blade 6 and the cylinder blocks 8 are moved in opposite directions. During this cycle of operation, the products of combustion will have been expelled from the combustion chambers A and B, and the exhaust ports 80 are thereupon closed by the cylinder blocks 8. It will be observed that when the exhaust port is closed the air inlet ports 44 remain open for a short interval of time to admit an increased quantity of air to raise the compression in the combustion chambers.

As the cycle progresses, the elongated slots 26 in the end plates 24 move into registry with the slots 28, communicating by way of passageway 40 with the high pressure fuel and air blower 42, to admit a rich charge of fuel and air to the combustion chambers A and B. Further movement closes the slots 28 to shut off the fuel and air inlet. After the fuel and air inlet has been closed, the free air passage 44 remains open for a short interval of time to increase the compression ratio. When the air inlet passage 44 is closed, the elements are in the position shown in Figure 10 preparatory to compressing the charge in the combustion chambers A and B, whereupon the cycle illustrated in Figure 6 et seq. will be repeated.

Referring now to Figure 10, it will be observed that when the air inlet ports 44 are closed the cylinder blocks 8 have moved beyond the exhaust ports 80 a considerable distance. However, when the exhaust ports 80 of the combustion chambers A and B are open, it will be observed that the blades 6 are in a position adjacent to the inlet ports 44. The expansion ratio of the engine is therefore greater than the compression ratio by an amount proportional to the difference between the space represented in the combustion chambers A and B of Figure 7 over the space represented by the combustion chambers A and B of Figure 10. Over-expansion is thus produced, which increases the efficiency of the engine and makes it possible to secure more power from a given quantity of fuel and air mixture than is possible with engines not operating on the over-expansion principle.

Attention is directed to the fact that the charging slots 26 do not register with the charging slots 28 to admit a charge of fuel and air until the exhaust ports 80 have been closed. The result of this method of operation is that no combustible fuel is discharged through the exhaust ports 80 during the charging cycle, because nothing but free air is admitted to facilitate the scavenging operation until the exhaust ports 80 have been closed. This engine, therefore, develops more power per quantity of fuel burned than engines of the conventional two-cycle type.

The structure illustrated results in a symmetrically balanced engine wherein power impulses are exerted on opposite sides of the power cylinder 2 simultaneously, and the inertia forces due to a moving piston are balanced because of the fact that the blades 6 and the cylinder blocks 8 move in opposite directions.

Referring now again to Figure 1, it will be observed that the water pump 66 is provided with two outlets 82 and 84. The outlet 82 discharges water through the water jacketed housing 86 of the centrifugal blower 46 to cool the blower. The water is then circulated through the housing 30 to cool the end plates of the power cylinder 2. The water outlet 84 communicates with a water inlet 88 leading to the central hollow portion 90 of the oscillating hub 4. The water passes through openings 92 into the oscillating blade 6 to cool the blade structure, and then through an opening 94 into the end plates 96 to cool that portion of the structure. The water circulates through the oscillating blade 6 and returns through a passageway 98 to a chamber 100 surrounding an inlet port 90 and is directed to the outlet 101, whereupon the water is pumped back to the inlet 103 of the water pump 66.

Novel sealing means, comprising a washer 105 of cork or other suitable material yieldingly urged by a spring 107, engages a washer 109 concentrically mounted on the shaft supporting the oscillating blade 6 adjacent the needle bearings 38 to prevent the cooling medium from escaping through the end of the bearings 38.

The high pressure blower 42 communicates with a carburetor or other suitable fuel and air mixing device (not shown in Figure 1) and supplies a rich mixture to the combustion chambers of the engine under high pressure. The blower 42 is of the sliding vane type, and is provided with means to relieve the housing of the blower from the centrifugal forces exerted by the vanes 111 as they are rotated at high speeds. A pair of raceways 113 are fixed in the side walls of the cylindrical portion of the blower and are mounted non-concentrically with respect to the cylindrical section of the blower. A support 115 is positioned adjacent the raceways 113 and is separated therefrom by needle bearings 117 adapted to carry the centrifugal loads and to prevent excess pressures generated by the vanes 111 from being exerted upon the cylindrical walls of the blower.

The embodiment of the invention illustrated in Figures 2 and 3 is similar in many respects to the embodiment illustrated in Figure 1. Corresponding parts have therefore been given corresponding reference numerals with the addition of 100.

It will be observed that the rich mixture of fuel and air is supplied to the engine from a carburetor 171, which discharges to a supercharger 173 driven at high speed by means of a pinion 175 and a gear 177 fixed to the crank shaft 116. The supercharger 173 communicates with the slots 128 by means of a conduit 179.

Liquid for cooling this engine is supplied through a conduit 181, communicating with the interior of the blades 106 by means of passageways 183. The liquid circulates through the blades 106 and is discharged into an annular passageway 185, surounding the conduit 181, and thence to the outlet 187, which returns the liquid to the liquid pump, driven by an accessory driving shaft of the engine. Some of the liquid supplied through the conduit 181 passes through passageways 189 into the interior chambers 191 in the cylinder blocks 108 to cool them. After circulating through the chambers 191, the liquid is returned through orifices 193 to the passageway 185, surrounding the conduit 181, and thence back to the cooling system.

While the invention has been described with particular reference to certain preferred embodiments thereof, it is to be understood that the scope of the invention is not to be limited by the features illustrated and described, or otherwise than by the terms of the following claims.

I claim:

1. In a two cycle engine having a cylinder containing oscillating members adapted to move in opposite directions and with said cylinder forming four combustion chambers between the oscillating members, a driven shaft connected to both of the oscillating members and driven continuously in one direction by oscillation of said members in opposite directions, means to supply a rich mixture of fuel and air to the combustion chambers, means to move the oscillating members to compress the charge, means to ignite the charge, exhaust means to permit discharge of the products of combustion from the combustion chambers, a blower, and free air inlet means connected to the blower to admit air to the combustion chambers to discharge the products of combustion therefrom through said exhaust means, said fuel and air supply means becoming operable only after the exhaust means has moved to the closed position but prior to the closing of the free air inlet means and the compressing of the charge.

2. In an engine having a cylinder, a crank shaft, a plurality of oscillating members in said cylinder adapted to move towards and away from each other, connecting means between the oscillating members and the crank shaft and driving the crank shaft continuously in the same direction when said members are oscillated in opposite directions, said cylinder and said members cooperating to form four combustion chambers between adjacent oscillating members, means to admit a combustible charge to the combustion chambers, and means to discharge the products of combustion from the combustion chambers, said connecting means being proportioned to move the oscillating members further on the power stroke before the discharge means opens than the oscillating members are moved on the compression stroke after the combustible mixture admitting means closes.

3. In an engine having an elongated cylinder, an oscillating hub having blades extending to the cylinder concentrically mounted in the cylinder, oscillating pistons between the blades and extending between the hub and cylinder, said cylinder and said blades and pistons cooperating to form four combustion chambers between the blades and pistons, exhaust means in the cylinder controlled by the pistons, air inlet means in the cylinder controlled by the blades, and means including a ported disc movable with the pistons and registrable at intervals with a port in the wall of said cylinder to admit a small quantity of a very rich mixture of fuel and air to the combustion chambers after the exhaust means has been closed by the pistons but prior to the closing of the air inlet means and compression of the charge.

4. An engine having a cylinder, an oscillating hub having blades extending to the cylinder concentrically mounted in the cylinder, oscillating pistons between the blades and extending between the hub and cylinder, said cylinder and said blades and pistons cooperating to form four combustion chambers between the blades and pistons, exhaust means in the cylinder controlled by the pistons, air inlet means in the cylinder controlled by the blades, means including a ported disc movable with the pistons to admit a combustible mixture to the combustion chambers after the exhaust means has been closed by the pistons, a rotatable crank shaft, and linkage means connecting the hub and pistons to the crank shaft, said linkage being proportioned to close the exhaust means considerably before the air inlet means is closed on the compression stroke and to open the exhaust and air inlet means practically simultaneously on the power stroke to produce over-expansion.

5. In an engine, a cylinder and two oppositely oscillating diametrically disposed piston elements dividing the cylinder into four combustion chambers, said cylinder being formed with two inlet and two exhaust ports spaced alternately about the periphery of the cylinder, each of said ports being uncovered alternately on opposite sides of the adjacent piston element to admit or exhaust gases from the pair of combustion chambers adjacent the respective port, a shaft, and means for converting the oscillation of the piston elements into rotary motion of the shaft.

6. In an engine, a cylinder and two oppositely oscillating diametrically disposed piston elements dividing the cylinder into four combustion chambers, said cylinder being formed with two inlet and two exhaust ports spaced alternately about the periphery of the cylinder, each of said ports being uncovered alternately on opposite sides of the adjacent piston element to admit or exhaust gases from the pair of combustion chambers adjacent the respective port, a shaft, and means for converting the oscillation of the piston elements into rotary motion of the shaft, said last named means being constructed and arranged to cause the piston element controlling the exhaust port to oscillate in advance of the other piston element.

7. In an engine, a cylinder and two oppositely oscillating diametrically disposed piston elements dividing the cylinder into four combustion chambers, said cylinder being formed with a pair of diametrically opposed inlet ports positioned in the angular center of oscillation of one of said elements and a pair of diametrically opposed exhaust ports positioned in the center of oscillation of the other of said elements and each of said ports being uncovered alternately on opposite sides of the adjacent oscillating piston element to admit or exhaust gases from the pair of combustion chambers adjacent the respective port.

8. In an engine, a cylinder and two oppositely oscillating diametrically disposed piston elements dividing the cylinder into four combustion chambers, said cylinder being formed with a pair of diametrically opposed inlet ports positioned in the angular center of oscillation of one of said elements and a pair of diametrically opposed exhaust ports positioned in the center of oscillation of the other of said elements and each of said ports being uncovered alternately on opposite sides of the adjacent oscillating piston element to admit or exhaust gases from the pair of combustion chambers adjacent the respective port, said cylinder having an end wall formed with a third pair of ports and one of said elements having an end plate having corresponding ports adapted to register with said third pair of ports twice in each oscillation of said element so that each port admits fuel alternately to one or the other of an adjacent pair of combustion chambers.

9. In an engine, a cylinder and two oppositely oscillating diametrically disposed piston elements dividing the cylinder into four combustion chambers, said cylinder being formed with a pair of diametrically opposed inlet ports positioned in the angular center of oscillation of one of said elements and a pair of diametrically opposed exhaust ports positioned in the center of oscillation of the other of said elements and each of said ports being uncovered alternately on opposite sides of the adjacent oscillating piston element to admit or exhaust gases from the pair of combustion chambers adjacent the respective port, a crankshaft, and means for converting the oscillatory motion of said elements into rotary motion of said crankshaft, said last named means being constructed and arranged to cause the piston element controlling the exhaust port to oscillate in advance of the other piston element.

10. In an engine, a cylinder, two oscillating piston elements in said cylinder dividing the cylinder into four chambers, arms connected to said members outside of said cylinder, and a crankshaft having two cranks angularly disposed to each other, connecting rods connecting each arm to a crank, said cylinder being formed with a pair of exhaust ports positioned diametrically and substantially in the center of oscillation of one of said elements and adapted to be uncovered by said one element at one side at one extreme of oscillation of said element and at the other side at the other extreme of oscillation of said element and said cylinder being formed with a pair of inlet ports similarly disposed and controlled with relation to said other piston element, said angular relation of the cranks being so proportioned that the piston element controlling the exhaust ports oscillates in advance of the other piston element.

11. In an engine, a cylinder, a pair of oscillating elements dividing the cylinder into a plurality of combustion chambers, said cylinder being formed with two sets of ports, one set being opened and closed by one of said elements as it oscillates and the other set being opened and closed by the other of said elements, arms connected to said elements, a crankshaft having two cranks, and connecting rods connecting the cranks and the arms, said cranks being angularly disposed so that one oscillating element oscillates in advance of the other to open and close the ports controlled thereby in advance of the opening and closing respectively of the other set of ports.

12. In an engine, a cylinder, a pair of oscillating elements dividing the cylinder into a plurality of combustion chambers, said cylinder being formed with two sets of ports, one set being opened and closed by one of said elements as it oscillates and the other set being opened and closed by the other of said elements, a rotary shaft, and connections from said elements to said shaft for transmitting power thereto, said connections being constructed and arranged so that one oscillating element oscillates in advance of the other to open and close the ports controlled thereby in advance of the opening and closing respectively of the other set of ports.

ALFRED M. NEY.